May 12, 1936. W. J. TIETZ ET AL 2,040,285
METHOD OF MEASURING FLUID PRESSURE
Filed Jan. 13, 1933
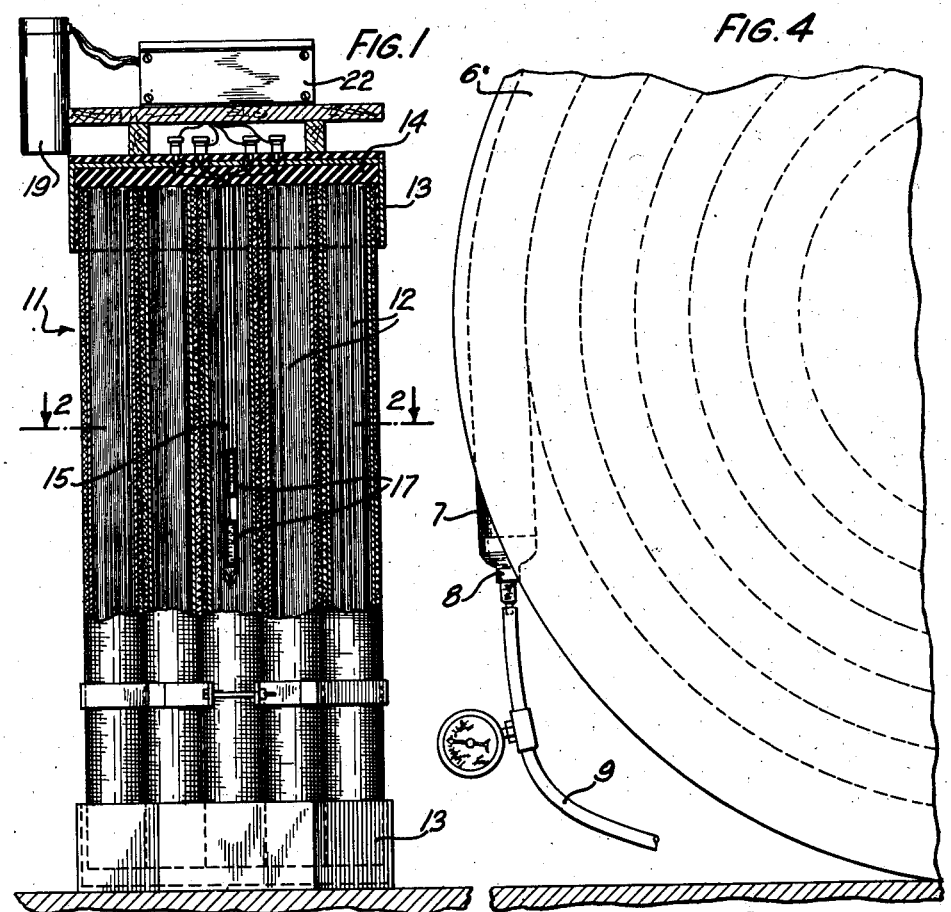
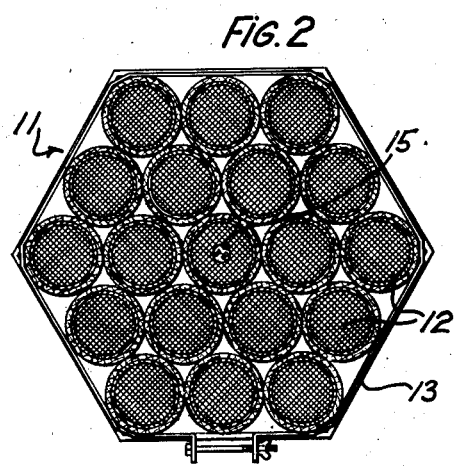
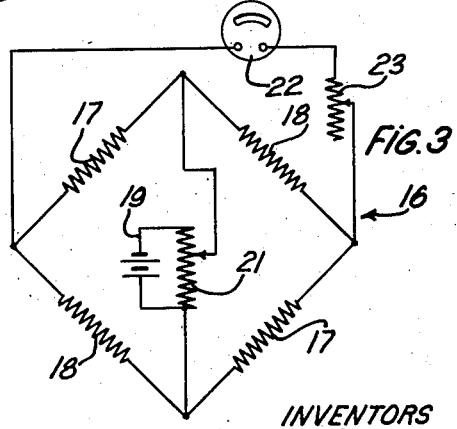
INVENTORS
W. J. TIETZ
F. J. LENGVENIS
BY H. Q. Whitehorn
ATTORNEY Patented May 12, 1936

2,040,285

UNITED STATES PATENT OFFICE

2,040,285

METHOD OF MEASURING FLUID PRESSURE

William J. Tietz, Hinsdale, and Frank J. Lengvenis, Chicago, Ill., assignors to Western Electric Company, Incorporated, New York, N. Y., a corporation of New York Application January 13, 1933, Serial No. 651,490

7 Claims. (Cl. 137—77)

This invention relates to a method of measuring fluid pressure and more particularly to a method of measuring gas pressures as related to an absolute value.

In recent years lead covered cables armored with steel tape have been laid directly in the ground for telephone communication systems. Inasmuch as the cable is not readily accessible when thus laid, it is difficult to locate leakages in the lead sheath covering the cable and, therefore, it is essential that the sheath be thoroughly tested to insure that it is hermetically sealed before it is laid in the ground, since the seepage of water or moisture into the cable will damage the cable.

An object of the invention is to provide an effective and efficient method of measuring fluid pressure.

In accordance with one embodiment of the invention, a dummy cable is provided in which the conditions in a real cable as wound on a reel are simulated. The real cable is subjected to an internal gas pressure, the reading of which is correlated to absolute pressure by calculations based on the temperature in the dummy cable and the barometric pressure of the atmosphere.

A complete understanding of the invention may be had by reference to the following description taken in conjunction with the accompanying drawing, in which Fig. 1 is a side elevation, partly in section, of a device embodying the invention and by means of which the method of the invention may be practiced;

Fig. 2 is a cross-section taken on lines 2—2 of Fig. 1;

Fig. 3 is a circuit diagram of a temperature measuring device; and

Fig. 4 is a fragmentary elevation of a cable mounted on a reel.

It is customary when cables, such as lead covered cables or tape armored cables, are made to wind the cables on a reel for convenience in handling and transportation. A reel 6 is shown having a cable 7 wound thereon, which may either be a lead covered cable or a tape armored cable, having one or more layers of steel tape wound over the lead sheath to protect the sheath when the cable is laid in the ground. The end of the cable adjacent the drum of the reel is usually hermetically sealed in order to permit the application of a higher than atmospheric pressure to the interior of the cable. A screw threaded stem 8 may be sealed to the other end of the cable, as, for instance, by positioning the stem on the end of the cable and pouring molten lead around the stem. A flexible tube 9 leading to a source of fluid pressure is then attached to the stem 8 and a pressure is applied to the interior of the cable. Preferably nitrogen gas is used for this purpose and a pressure of approximately 15½ pounds per square inch is applied to the cable. Since the interior of the cable sheath is substantially filled with insulated conductors, the pressure must sometimes be applied for a long time in order that it may equalize throughout the cable. In some instances it may be desirable to apply a higher initial pressure to insure that all the interstices between the insulated conductors are penetrated after which a lower pressure is applied. This materially reduces the time required to obtain a uniform pressure within the cable. The purpose of applying the gas pressure to the cable is to determine whether the sheath enclosing the insulated conductors is sound and hermetically sealed throughout. However, due to variations in atmospheric or barometric pressure and also due to the changes in the temperature of the ambient atmosphere, the pressure in the interior of the cable may vary to such an extent as to make it impossible to determine whether or not there has been any leakage from the cable. It is necessary, therefore, to refer the measured pressure in the cable to some absolute value in order to eliminate the effects of variations and atmospheric pressure and temperature.

For this purpose a dummy cable 11 is provided which comprises a bundle of short lengths 12 of cable similar to the cable being tested. In the preferred form of the invention 19 of such lengths are formed into a hexagonal bundle, as shown in Fig. 2. The top and bottom ends of this bundle are provided with caps 13 which support the cable lengths in position and also retain a heat insulating material 14, such as rock wool or other suitable insulating material, over the ends of the cable lengths so that no appreciable amount of heat will penetrate the interior of the dummy cable from the ends of the cable lengths. When the cable lengths are arranged in a hexagonal bundle, as described above, the central cable will be three layers deep within the bundle from any point on the periphery thereof, thus simulating an average convolution of the cable when wound on the reel. The central cable is provided with a longitudinal opening 15 which may be formed by driving a pointed rod into the central cable length. The temperature in the center of this central cable length is measured by a thermometer bridge circuit 16 having two resistance elements 17 of nickel and two resistance elements 18 of manganin. A battery 19 associated with a potentiometer provides a source of energy for the bridge circuit and a galvanometer 22 is connected to the output points of the bridge circuit which may be calibrated to read temperature directly, and the zero point of the galvanometer may be adjusted by means of a variable resistance 23. The nickel resistance elements 17 have a high coefficient of temperature resistance variation, while the resistance of the elements 18 is practically invariable for ordinary atmospheric temperature variations. The elements 17 are inserted in the central cable, substantially as shown in Fig. 1.

To illustrate the method of practicing the invention, a cable or a number of cables are placed in a room and the dummy cable is placed in convenient proximity thereto. After the cable has been in the room long enough to allow the cables on the reels and the dummy cable to reach similar conditions of temperature, the cable on the reel is subjected to an internal gas pressure, as described above, and the temperature in the dummy cable is noted, as well as the atmospheric pressure. The pressure is then allowed to remain in the cable on the reel for about forty hours, after which the pressure is measured. When a pressure reading is made of the gas pressure in the cable, the temperature in the dummy cable and the atmospheric pressure are also noted and the measured pressure is correlated to an absolute value by correcting the measured pressure with reference to the temperature and barometric pressure of the atmosphere. If, after a sufficient time has elapsed, there is no variation in the pressure in the cable as related to the absolute pressure, the cable is ready for use.

It will be understood that the nature and embodiment of the invention herein described and illustrated is merely a convenient and useful form of the invention and that many changes and modifications may be made therein without departing from the spirit and scope of the invention.

What is claimed is:

1. A method of measuring the absolute gas pressure in a body, which comprises subjecting another body to similar conditions, measuring the relative pressure in the first body, and correcting said measurement in accordance with the conditions of the second body.

2. A method of measuring the absolute gas pressure in a hermetically enclosed cable wound on a reel, which comprises providing a dummy cable for simulating the conditions of a cable on a reel, measuring the gas pressure in a cable on the reel, and correcting said measurement in accordance with the conditions of the dummy cable.

3. A method of testing a sheathed cable for hermetic defects, which comprises applying an internal gas pressure to the cable, providing a dummy cable, measuring the temperature of the gas in the dummy cable, and correlating said temperature to the pressure in the cable to detect leakage in the cable sheath.

4. A method of testing a sheathed cable for hermetic defects, which comprises applying a super-atmospheric internal pressure to the cable, and detecting leakage from the cable by indirectly determining the temperature in the cable and calculating the absolute pressure in the cable therefrom.

5. A method of testing a sheathed cable for hermetic defects, which comprises applying a super-atmospheric pressure to the cable, providing a dummy cable simulating the conditions of the cable, measuring the temperature of the gas in the dummy cable, determining the barometric pressure of the atmosphere, and computing the absolute pressure in the cable in accordance with said temperature and barometric pressure.

6. A method of testing a sheathed cable for hermetic defects, which comprises applying a super-atmospheric pressure to the cable at a known temperature, providing a dummy cable simulating the conditions of said cable, allowing the cable to stand for some time, then determining the pressure in the cable, determining the temperature in the dummy cable, and correlating the determined pressure in the cable with the temperature in the dummy cable to determine leakage from the cable.

7. A method of testing a sheathed cable for hermetic defects, which comprises applying a super-atmospheric pressure to the cable at a known temperature and barometric pressure, providing a dummy cable simulating the conditions of said cable, allowing the cable to stand for some time, then determining the pressure in the cable, determining the temperature in the dummy cable, determining the barometric pressure of the atmosphere, and correlating the determined pressure in the cable with the temperature in the dummy cable and the barometric pressure of the atmosphere to determine leakage from the cable.

WILLIAM J. TIETZ.
FRANK J. LENGVENIS.